Nov. 18, 1930.  C. EHRET  1,781,722
THIEF HOLE COVER
Filed Oct. 28, 1929   2 Sheets-Sheet 1

Inventor
CONRAD EHRET.
By E. H. Bond
Attorney

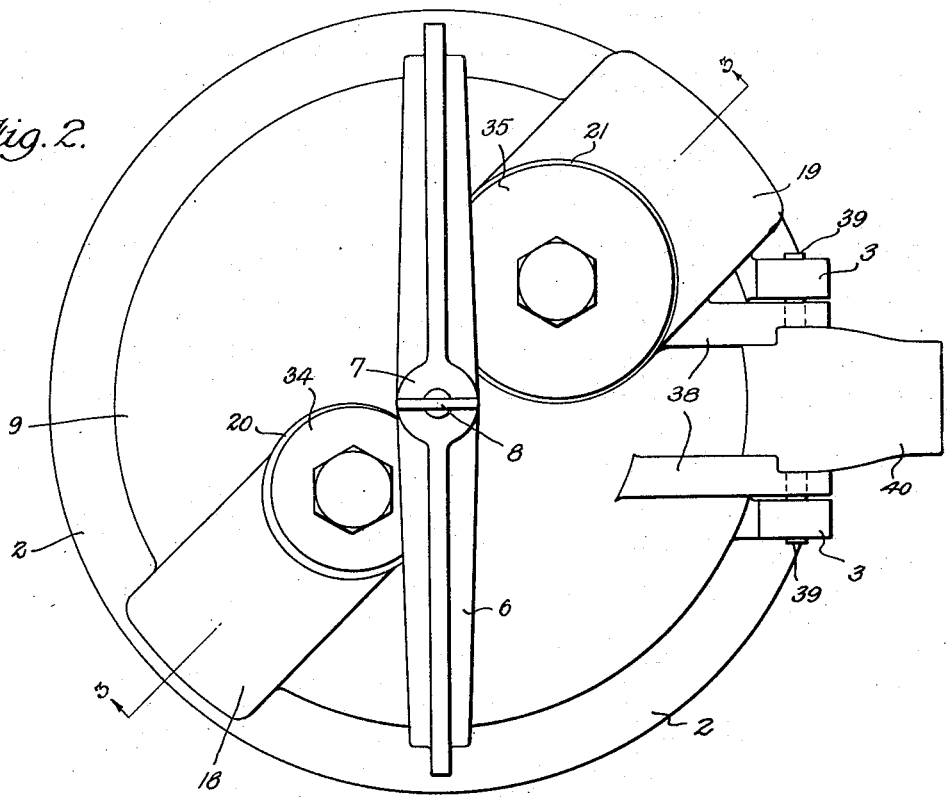
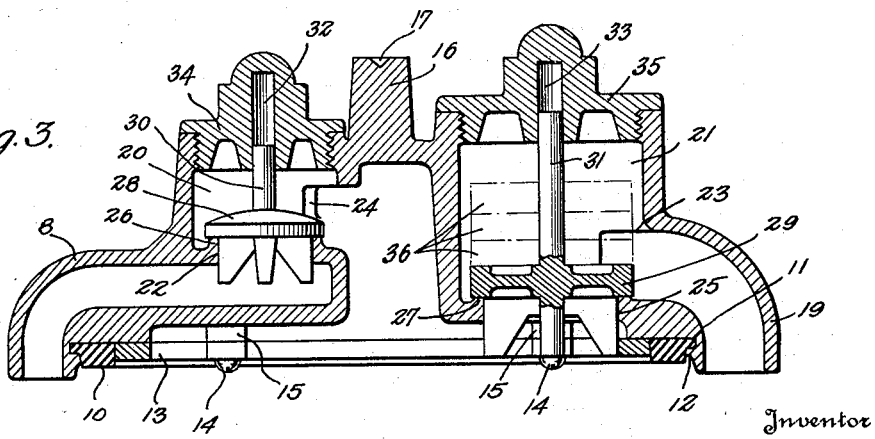

Patented Nov. 18, 1930

1,781,722

UNITED STATES PATENT OFFICE

CONRAD EHRET, OF OKLAHOMA CITY, OKLAHOMA

THIEF-HOLE COVER

Application filed October 28, 1929. Serial No. 403,028.

This invention relates to thief hole covers and one object of the invention is to provide a device of this character which may serve not only as a closure for a man hole in a tank car or other receptacle in which oil or other fluids are to be stored or shipped, but also constitute a valve structure serving to maintain a desired pressure in the tank and prevent damage to the tank by excessive pressure when filling the tank or the formation of a vacuum as the fluid is drawn out of the tank.

Another object of the invention is to allow opening of the pressure relief valve to be controlled and caused to accommodate itself to the type of fluid stored in a tank and prevent danger which might result from escape of gases from the tank.

Another object of the invention is to so form the inlet and outlet passages of the cover that dust and water will be prevented from blowing into these passages and interfering with proper closing of the valves or clogging the passages or spoiling the contents of a tank to which the cover is applied.

The improved thief hole cover is illustrated in the accompanying drawings wherein:—

Fig. 2 is a top plan view of the cover.

Fig. 3 is a transverse sectional view taken along the line 3—3 of Fig. 2.

Figure 1:
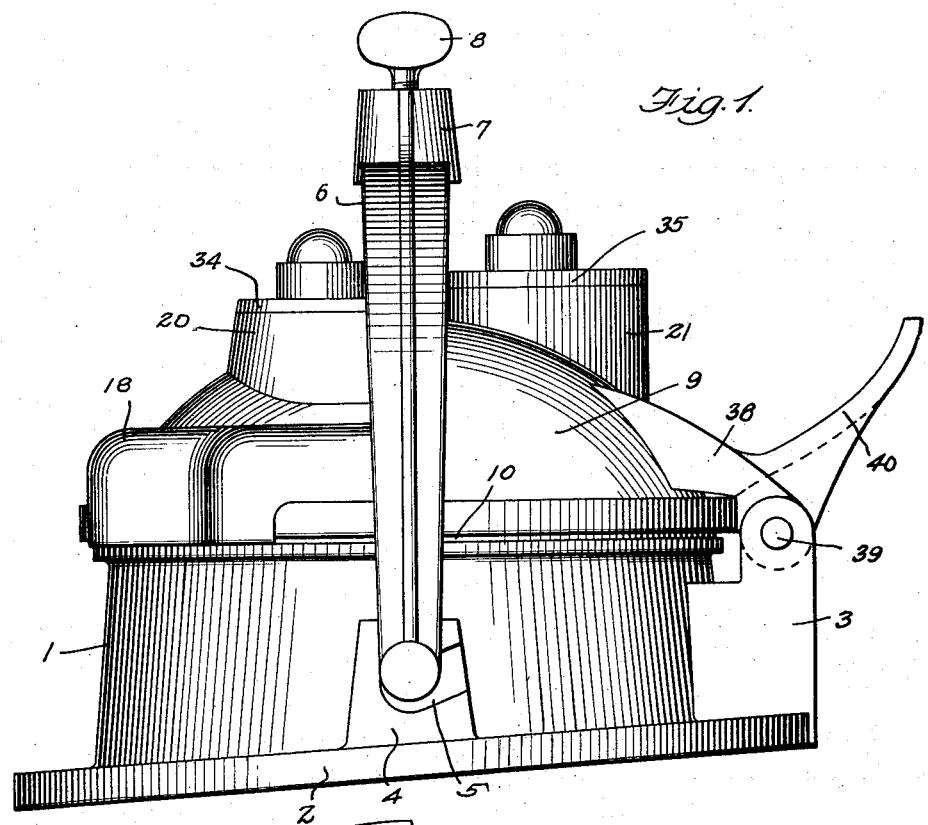
Fig. 1 is a side elevation of the improved cover.

This improved cover is intended to be applied to a tank car or other receptacle in which large quantities of oil, gasoline or other fluids are to be shipped or stored and is provided with an annular base 1 having an attaching flange 2 which may be welded to a tank about a man hole formed therein or secured to the tank by rivets, bolts, or in any other desired manner. A pair of hinged ears 3 rise from the flange at one side of the base and at diametrically opposite points are provided blocks 4 having sockets 5 formed therein to receive pivots at the ends of the arms of a yoke 6 and mount the yoke for swinging movement from the operative position shown in Figs. 1 and 2 to a reclining position. An internally threaded bearing 7 is formed centrally of the yoke and through this bearing is threaded a thumb screw 8 the purpose of which will be hereinafter set forth.

Figure 4:
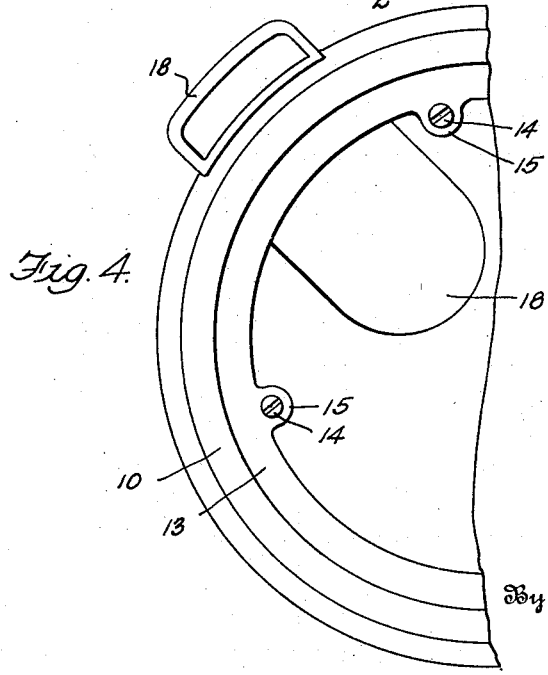
Fig. 4 is a fragmentary bottom plan view of the cover.

The upper edge face of the base is flat and upon this upper edge rests a cover 9 which is of a clamp-like formation and has applied against the under face of its marginal portions a gasket 10. This gasket has its outer marginal portions reduced in thickness to form a flange 11 overlapped by an annular inwardly extending flange or lip 12 of the cover and in order to firmly hold the gasket in place a retainer ring 13 is set in place as shown in Figs. 3 and 4 and secured by screws or equivalent fasteners 14 passed through the ring and engaged in rockets 15 provided upon the cover. A post 16 extends upwardly from the cover centrally thereof and has its upper end recessed as shown at 17 to form a seat for receiving the lower end of the thumb screw 8. Therefore, the thumb screw is tightened; it will not be liable to slip out of engagement with the post and pressure may be exerted to force the cover downwardly and compress the gasket against the upper edge face of the base to form a tight joint between the base and cover.

Figure 5:
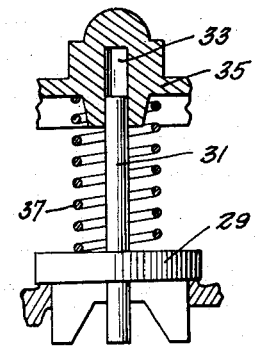
Fig. 5 is a fragmentary sectional view showing a spring used to control the opening of the pressure relief valve.

As previously explained it is desired to prevent damage to the tank by excessive pressure or the formation of a vacuum therein and in order to do so the cover is provided with valve controlled passages or conduits 18 and 19, one constituting an air inlet to prevent the formation of a vacuum and the other an outlet to prevent damage when excessive pressure is exerted by gases or air compressed in the top of the tank during filling thereof. These conduits lead from valve-housings 20 and 21 cast integral with the cover and have their outer ends curved downwardly at the margins of the cover so that air and gases may pass freely through the conduits but dust and rain will be prevented from being blown into them. At their inner ends the conduits communicate with valve housings through openings 22 and 23 and the valve housings communicate with the interior of the cover through openings 24 and 25. Valve seats 26 and 27 are formed about the openings 22 and 25 and in order to normally close the openings, valves 28 and 29 are employed which rest upon the seats when closed and are guided during movement towards and away from the seats by stems 30 and 31. These stems extend upwardly from the valves and are slidably received in pockets 32 and 33 formed in caps 34 and 35 which are screwed into the open upper ends of the housings and by removing these caps the valves may be lifted out of the houses when cleaning or repairs are necessary. The valve 28 is held shut by its own weight but the valve 29 is held shut either by a suitable number of weights 36 which rest thereon about its stem, as shown in Fig. 3, or by means of a spring 37 as shown in Fig. 5. If the spring 37 is employed the valve will always open at the same pressure, but when weights are used the pressure required to open the valve can be controlled according to the number of weights applied.

When this improved thief hole cover is in use the base is welded or otherwise firmly secured upon a tank about an opening formed therein and when the tank is to be filled, the cover which is hinged to the ears 3 by companion hinge ears 38 and a pin 39, may be swung to an opened position by pressure applied to its lever or handle 40 or the cover may be left closed and the oil or gasoline fed into the tank through another inlet. Gas accumulates in the tank and when the pressure reaches a certain point the valve 29 will be raised and allow the gas to escape through the passage 19. Therefore, danger of the tank bursting due to excessive gas pressure is eliminated and a tank may be safely filled with the cover closed or allowed to stand for an indefinite period of time without danger.

When a tank is emptied, a partial vacuum is formed in the tank above the oil and if a sufficient vacuum were formed the walls of the tank would be liable to collapse, but when this improved cover is used the valve 28 will open and allow air to pass inwardly as shown, as the vacuum creates sufficient suction. Therefore, the formation of an excessive vacuum in the tank will be prevented as well as excessive pressure and there will be no danger of the tank bursting or collapsing.

What is claimed is:

1. A thief hole cover for tanks comprising a base adapted to be secured upon a tank about an opening therein, a cover for the upper end of said base and formed with ports, an inwardly opening check valve for one port, and an outwardly opening check valve for the other port, said valves being disconnected and independent of each other and said ports being individually controlled.

2. A thief hole cover for tanks comprising a base adapted to be secured upon a tank about an opening therein, a cover for the upper end of said base and formed with ports, valve houses each independent of the other and each having an inner opening and an outer opening, conduits leading from the outer openings of said valve houses and having downturned outer ends, and check valves in said valve houses, the valve in one house opening inwardly and the valve in the other house opening outwardly.

3. A thief hole cover for tanks comprising a base adapted to be secured upon a tank about an opening therein, a cover for the upper end of said base and formed with ports, valve houses open at their upper ends, each valve house having a port in its bottom surrounded by an upstanding valve seat and a side port in its walls, conduits leading from said valve houses to the margins of said cover and each having a downturned outer end, the conduit of one house communicating with the port in its bottom and the conduit of the other house communicating with the side port thereof, caps for the upper ends of said houses, and valves in said houses normally seated upon the valve seats and movable upwardly to a closed position.

4. A thief hole cover for tanks comprising a base adapted to be secured upon a tank about an opening therein, a cover for the upper end of said base and formed with ports, valve houses open at their upper ends, each valve house having a port in its bottom surrounded by an upstanding valve seat and a side port in its walls, conduits leading from said valve houses to the margins of said cover and each having a downturned outer end, the conduit of one house communicating with the port in its bottom and the conduit of the other house communicating with the side port thereof, caps for the upper ends of said housings formed with pockets axially aligned with the lower ports of the houses, and valves in said houses normally seated upon said valve seats and having stems extending upwardly and slidably received in the pockets of said caps to guide movement of the valves onto and off of the seats.

5. A thief hole cover for tanks comprising a base adapted to be secured upon a tank about an opening therein, a cover for the upper end of said base and formed with ports, valve houses open at their upper ends, each valve house having a port in its bottom surrounded by an upstanding valve seat and a side port in its walls, conduits leading from said valve houses to the margins of said cover and each having a downturned outer end, the conduit of one house communicating with the port in its bottom and the conduit of the other house communicating with the side port thereof, caps for the upper ends of said houses, and valves in said houses normally seated upon the valve seats and movable upwardly to a closed position, means being provided in the house having the conduit leading from its side port to yieldably resist upward movement of the valve therein to an open position.

6. A thief hole cover for tanks comprising a base adapted to be secured upon a tank about an opening therein, a cover for the upper end of said base and formed with ports, valve houses open at their upper ends, each valve house having a port in its bottom surrounded by an upstanding valve seat and a side port in its walls, conduits leading from said valve houses to the margins of said cover and each having a downturned outer end, the conduit of one house communicating with the port in its bottom and the conduit of the other house communicating with the side port thereof, caps for the upper ends of said housings formed with pockets axially aligned with the lower ports of the houses, and valves in said houses normally seated upon said valve seats and having stems extending upwardly and slidably received in the pockets of said caps to guide movement of the valves onto and off of the seats, and disks in the valve house having its conduit leading from its side port, said disks resting upon the valve therein about its stem and serving to open the valve by pressure within the tank.

7. A thief hole cover for tanks comprising a base adapted to be secured about an opening in a tank, a cover for the upper end of said base hinged thereto and provided with an actuating lever, a sealing gasket carried by said cover to rest upon the upper edge of said base, a yoke pivoted to said base and extending across said cover when raised, a set screw carried by said yoke to engage the cover and force the cover downwardly to a tightly closed position, said cover having ports, an outwardly opening check valve for one port and an inwardly opening check valve for the other port.

In testimony whereof I affix my signature.

CONRAD EHRET.